July 12, 1932.    J. K. HARNESS    1,867,358
MOTOR MOUNTING
Filed Feb. 26, 1930

INVENTOR

Patented July 12, 1932

1,867,358

UNITED STATES PATENT OFFICE

J KING HARNESS, OF DETROIT, MICHIGAN, ASSIGNOR TO CHRYSLER CORPORATION, OF DETROIT, MICHIGAN, A CORPORATION OF DELAWARE

MOTOR MOUNTING

Application filed February 26, 1930. Serial No. 431,569.

This invention relates to a mounting and more particularly to a mounting between an internal combustion engine and the chassis frame of an automobile.

An object of the invention is to provide a thin, flat resilient member adapted to be secured between a supporting member and a member to be supported.

Another object of the invention is to provide attaching means on relatively movable members of the mounting which are in axial alignment with each other and to space these attaching means a distance corresponding to the thickness of the mounting.

Other objects and advantages of the invention will be more apparent from the following description taken in connection with the accompanying drawing, in which.

Figure 1:
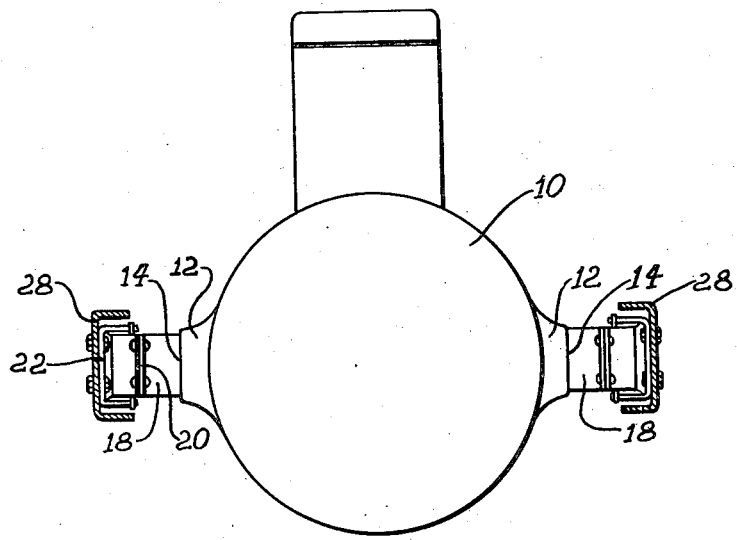
Fig. 1 is an end view of an internal combustion engine supported between the side frames of an automobile chassis, the side frame members being shown in section.
Figures 2, 3:
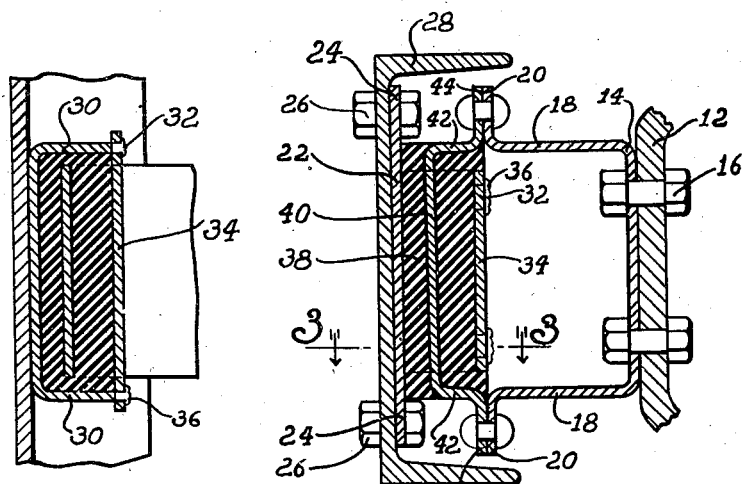
Fig. 2 is a sectional view through the frame member and mounting shown on a larger scale.
Fig. 3 is a sectional view taken on line 3—3 of Figs. 2.

Referring to the drawing, I have shown a conventional engine 10 having laterally extending arms 12 to each of which is secured a U-shaped stamping 14 by bolts 16. The outer ends of the side flanges 18 of the U-shaped member 14 are bent outwardly at right angles to the flanges 18, forming flanges 20, to which is secured the mounting.

The mounting is provided with a plate like member 22 having flanges 24 in which are openings for the reception of bolts 26 which secure the plate like member 22 to the chassis frame 28. The plate like member 22 is provided with inwardly extending flanges 30 and the flanges are provided with projections 32. A plate like member 34 is provided with openings to receive the projections 32 and the ends of the projections are peened over, as at 36, to hold the plate like member 34 on the ends of the flanges 30, spaced from the plate like member 22. It will be noted that the plate like members 22 and 34 are spaced apart and that these two plates together with the flanges 30 form a hollow rectangular member which is secured to the frame 28.

Between the spaced members 34 and 22 I have provided a resilient material 38, such as rubber, having its contacting faces vulcanized to the adjacent faces of the plate like members 22 and 34.

A U-shaped member 40 has its intermediate portion embedded in the resilient material 38 and the side flanges 42 of the U-shaped member 40 extend inwardly toward the engine arm. The outer ends of the flanges 42 are bent outwardly at right angles thereto, forming flanges 44 for engagement with the flanges 20. As shown on the drawing, the flanges 20 and 44 are secured together by rivets, or any suitable securing means, which extend through aligned openings in the flanges 20 and 44. The openings in the flanges 20 and 44 are also in axial alignment with the openings in the flanges 24. The flanges 44 extend approximately in the same plane as the plate like member 34.

It will be apparent that I have provided a comparatively thin rectangular member, having an intermediate member embraced by the rectangular member and by the resilient material, between the opposite faces of the rectangular member with securing means for the intermediate member and the rectangular portion in axial alignment and spaced apart approximately the thickness of the entire mounting.

Various changes, including the size, shape and arrangement of parts, may be made without departing from the spirit of my invention and it is my intention to cover by my claims such changes as may be reasonably included within the scope thereof.

I claim:

1. A mounting of the class described comprising, a rectangular member having lateral projections provided with openings, an intermediate member embraced by the rectangular member having lateral projections provided with openings, and rubber in the rectangular member embracing the intermediate member, the openings in one of the members being in axial alignment with the openings in the other member.

2. A mounting of the class described comprising, a rectangular member having lateral projections provided with openings, an intermediate member embraced by the rectangular member having lateral projections provided with openings, and rubber in the rectangular member embracing the intermediate member, the lateral projections of the rectangular member being in the plane of one side of the rectangular member and the lateral projections of the intermediate member being in the plane of the opposite side of the rectangular member.

3. A mounting of the class described comprising, a U-shaped member having a base portion and side flange portions, outwardly extending flanges on said side flanges provided with openings, a rectangular member embracing the base portion of said U-shaped member, outwardly projecting flanges on said rectangular member having openings in alignment with the openings in the flanges on the side flanges, and rubber between the base portion of said U-shaped member and a face of the rectangular member uniting the U-shaped member and the rectangular member together.

J KING HARNESS.